June 23, 1925.
C. A. KESSLER
SAWING MACHINE
Filed Oct. 6, 1924
1,543,165
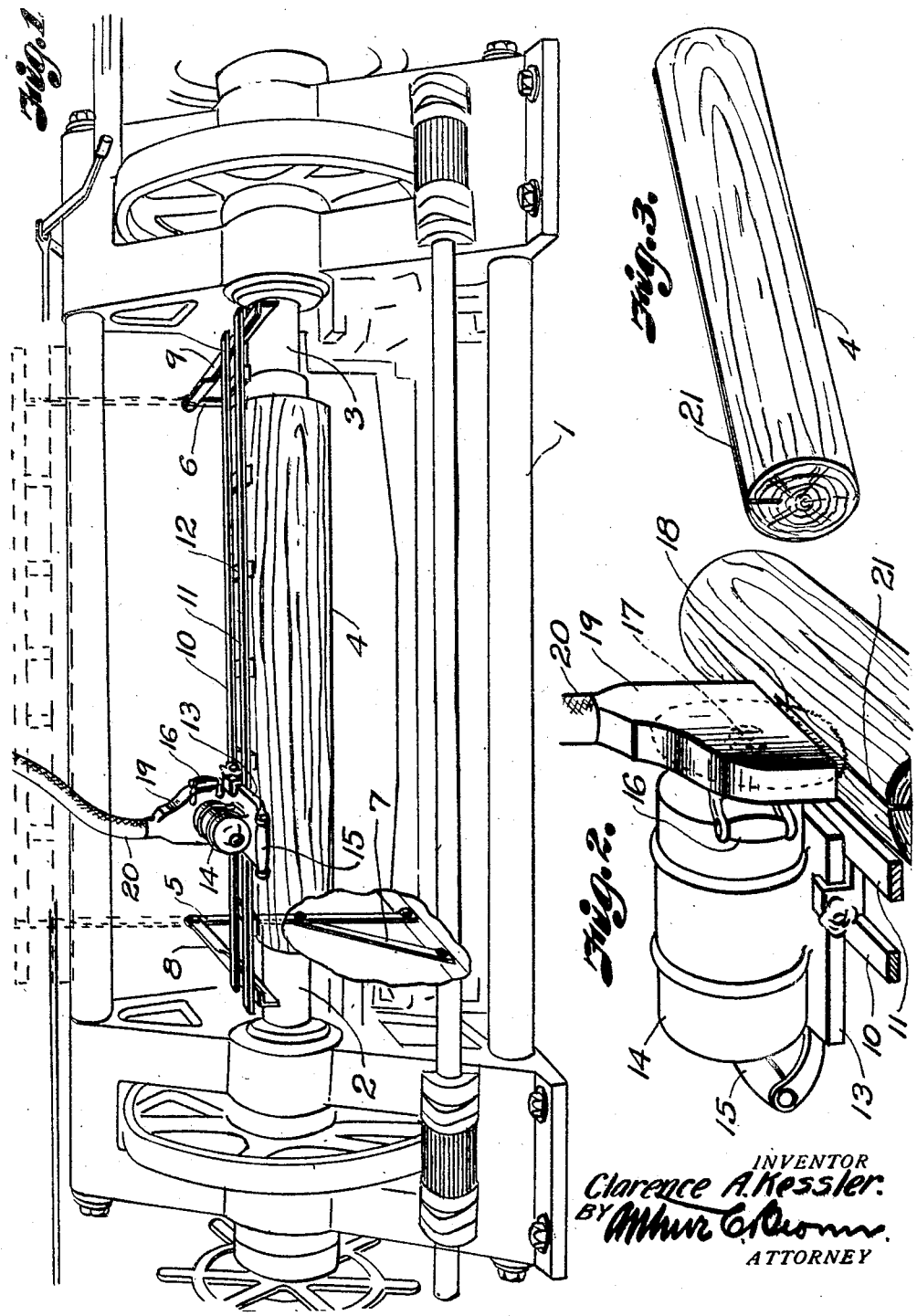
INVENTOR
Clarence A. Kessler.
BY Arthur C. Brown
ATTORNEY Patented June 23, 1925.

1,543,165

UNITED STATES PATENT OFFICE.

CLARENCE A. KESSLER, OF KANSAS CITY, MISSOURI, ASSIGNOR TO PENROD WALNUT & VENEER COMPANY, OF KANSAS CITY, MISSOURI, A CORPORATION OF MISSOURI.

SAWING MACHINE.

Application filed October 6, 1924. Serial No. 741,928.

*To all whom it may concern:*

Be it known that I, CLARENCE A. KESSLER, a citizen of the United States, residing at Kansas City, in the county of Jackson and State of Missouri, have invented certain new and useful Improvements in Sawing Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a sawing machine primarily intended for cutting a kerf or groove in a log, from which veneers are to be cut.

Ordinarily the veneering machine first forms the veneer, the veneer being broken or stripped off the log from time to time. By cutting a longitudinal werf or groove in the log, the veneer will automatically drop off after the veneering machine has cut a ply around the circumference of the log. The veneer sheet will then have straight edges and the end of one sheet will match up as to grain with the next sheet cut. This is an important feature in veneer forming methods.

The mechanism for carrying out the invention will be clearly understood by reference to the following description in connection with the accompanying drawings, in which Fig. 1 is a side elevational view of a veneer machine conforming to standard practice with the kerfing mechanism applied.

Fig. 2 is a detailed perspective view of the saw, the motor and the hood over the saw, showing the saw forming the kerf in the log, and Fig. 3 is a perspective view of the log after the kerf has been made.

The veneer machine 1 conforms to standard practice and it is provided with the usual chucks 2 and 3 for turning the log 4 in the usual way. Secured to the machine by any appropriate means are two standards 5 and 6 each of which is braced by an inclined brace member 7 having one end fastened to the machine 1 and the other to its standard between the ends of the standard with which it co-operates.

Pivoted to the upper ends of the respective standards are track supporting arms 8 and 9 which support the longitudinally arranged rails 10 and 11 connected by the cross bars 12 to form a track or guide-way on which the base 13 for the motor 14 may slide. The motor carries two handles 15 and 16 so that the operator may use both hands to move the motor base along the track or guide-way.

The shaft 17 of the motor drives a circular saw 18 encased in a hood 19 communicating with the tube 20 to which an exhauster may be connected to carry off the saw dust. The arms 8 and 9 are pivoted to the standards 5 and 6 so that they can be swung up to vertical position as indicated by dotted lines in Fig. 1. When the arms 8 and 9 are in vertical position, the cutting mechanism will be swung up out of the way so that the veneer can be cut from the log.

Preparatory to cutting the veneer from the logs, however, the arms 8 and 9 will be swung down to the position shown in Fig. 1 with the cutting mechanism at one end of the track or guide-way. Then the operator will move the cutting mechanism along the track or guide-way so as to cut the longitudinal kerf or slot 21 in the log 4. The edge of the slot 21 will be the starting point for cutting the veneer and the ply will be taken off around the log in the usual way. When the kerf has been cut, the cutting mechanism will be swung back to the dotted line position shown in Fig. 1.

What I claim and desire to secure by Letters Patent is:—

1. A machine for cutting kerfs in logs, comprising a longitudinal track of guide-way, a support to which one side of the guideway is pivoted so that the weight of the guideway will cause its free side to swing downwardly until it contacts with a part of the log-carrying machine to maintain the guideway in a horizontal plane, and a saw movable along the guideway.

2. In a machine for cutting kerfs in logs, pivotally supported arms, a guideway carried by the arms, and kerf cutting mechanism slidable on the guideway, the pivoted arms having downwardly swinging movement across the machine so that the machine will act as a stop to prevent movement of the arms below a horizontal plane.

3. In a machine for cutting kerfs in logs, a log-supporting mechanism, vertical standards in spaced relation to one side of the center of the log-supporting mechanism, arms pivoted to the standards, a guideway supported by the pivoted arms, and a motor driven saw slidable along the guideway, the arms extending across the log-supporting mechanism so that the log-supporting mechanism serves as a stop to limit the downward swinging movement of the free ends of the arms.

4. In combination, a veneering machine including log-engaging chucks in axial alignment for supporting the log, standards carried by the veneering machine, pivoted arms carried by the standards, a guideway carried by the arms, and a longitudinally movable saw cutting mechanism supported on the guideway, the arms overlying parts of the veneering machine so that said parts constitute stops for limiting the downward swinging movements of the free ends of the arms.

In testimony whereof I affix my signature.

CLARENCE A. KESSLER.